(12) United States Patent
Gorgoglione

(10) Patent No.: US 8,752,794 B2
(45) Date of Patent: *Jun. 17, 2014

(54) DOOR ASSEMBLY, IN PARTICULAR FOR A HELICOPTER, PROVIDED WITH AN EMERGENCY RELEASE DEVICE

(71) Applicant: Agustawestland S.p.A., Samarate (IT)

(72) Inventor: Giorgio Gorgoglione, Samarate (IT)

(73) Assignee: Agustawestland S.p.A., Samarate (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,965

(22) Filed: Sep. 27, 2013

(65) Prior Publication Data
US 2014/0059934 A1 Mar. 6, 2014

Related U.S. Application Data

(62) Division of application No. 13/267,544, filed on Oct. 6, 2011.

(30) Foreign Application Priority Data

Oct. 6, 2010 (EP) ..................................... 10425325

(51) Int. Cl.
B64C 1/14 (2006.01)

(52) U.S. Cl.
USPC ...................................................... 244/129.5

(58) Field of Classification Search
None
See application file for complete search history.

(56) References Cited

U.S. PATENT DOCUMENTS

2012/0085865 A1* 4/2012 Gorgoglione ............... 244/129.5

* cited by examiner

Primary Examiner — Tien Dinh
Assistant Examiner — Jessica Wong
(74) Attorney, Agent, or Firm — McDonnell Boehnen Hulbert & Berghoff LLP

(57) ABSTRACT

A door assembly, in particular for a helicopter, has a post; a door fitted to the post by a first and second hinge arranged on an outer wall of the post, so as to rotate about a hinge axis to open and close a door opening; and an emergency release device having a release handle, and a stem which extends through the post along a release axis substantially perpendicular to the hinge axis, rotates axially, in response to operation of the release handle, from a first to a second angular position to detach the door from the post, and is fixed at one axial end to the first hinge; the release handle being connected to the stem to rotate together with the stem about its release axis.

9 Claims, 7 Drawing Sheets

DOOR ASSEMBLY, IN PARTICULAR FOR A HELICOPTER, PROVIDED WITH AN EMERGENCY RELEASE DEVICE

CROSS REFERENCE TO RELATED APPLICATIONS

This application is a division of U.S. patent application Ser. No. 13/267,544, filed on Oct. 6, 2011, and claims the benefit of European Patent Application No. 10425325.7, filed on Oct. 6, 2010, which applications are hereby incorporated herein by reference.

BACKGROUND OF THE INVENTION

As is known, aircraft must be equipped with emergency exits to allow occupants to exit quickly in the event, for example, of a crash. The ordinary service exits on the aircraft are also sometimes used as emergency exits; in which case, the service exit door is equipped with an emergency release device, in addition to the normal opening handle. In known solutions, the emergency release device comprises a release handle fitted to a post, to which the door is hinged by means of two hinges. When operated, the handle, by means of rods and/or levers, acts simultaneously on the two hinges to move the two hinge seats, unseat the hinge pins, and so detach the door from the post to free the door opening. One solution of this type is described, for example, in U.S. Pat. No. 3,851,845.

A similar solution is described in U.S. Pat. No. 4,102,011, in which the emergency release device is fitted to the door, and acts on two retaining pins fitted to respective hinges to hold the hinges on the door. When the release handle is operated, the retaining pins withdraw simultaneously inwards of the door, which is thus detached from the hinges and can be expelled from the door opening.

The above known solutions are unsatisfactory, on account of the bulk and weight of the emergency release device, which features rods and/or levers to act simultaneously on two vertically spaced hinges. Moreover, in solutions such as the one described in U.S. Pat. No. 4,102,011, the weight of the emergency release device, and the fact that it is actually fitted to the door, make the door more difficult to expel.

SUMMARY OF THE INVENTION

It is an object of the present invention to provide a door assembly, in particular for a helicopter, which is provided with an emergency release device, is designed to provide a cheap, simple solution to the above drawbacks, preferably comprises a door that moves automatically away from the door opening when the device is operated, and/or features a system for accurately adjusting the position of the door at the assembly stage.

According to the present invention, there is provided a door assembly, in particular for a helicopter, provided with an emergency release device, as defined in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
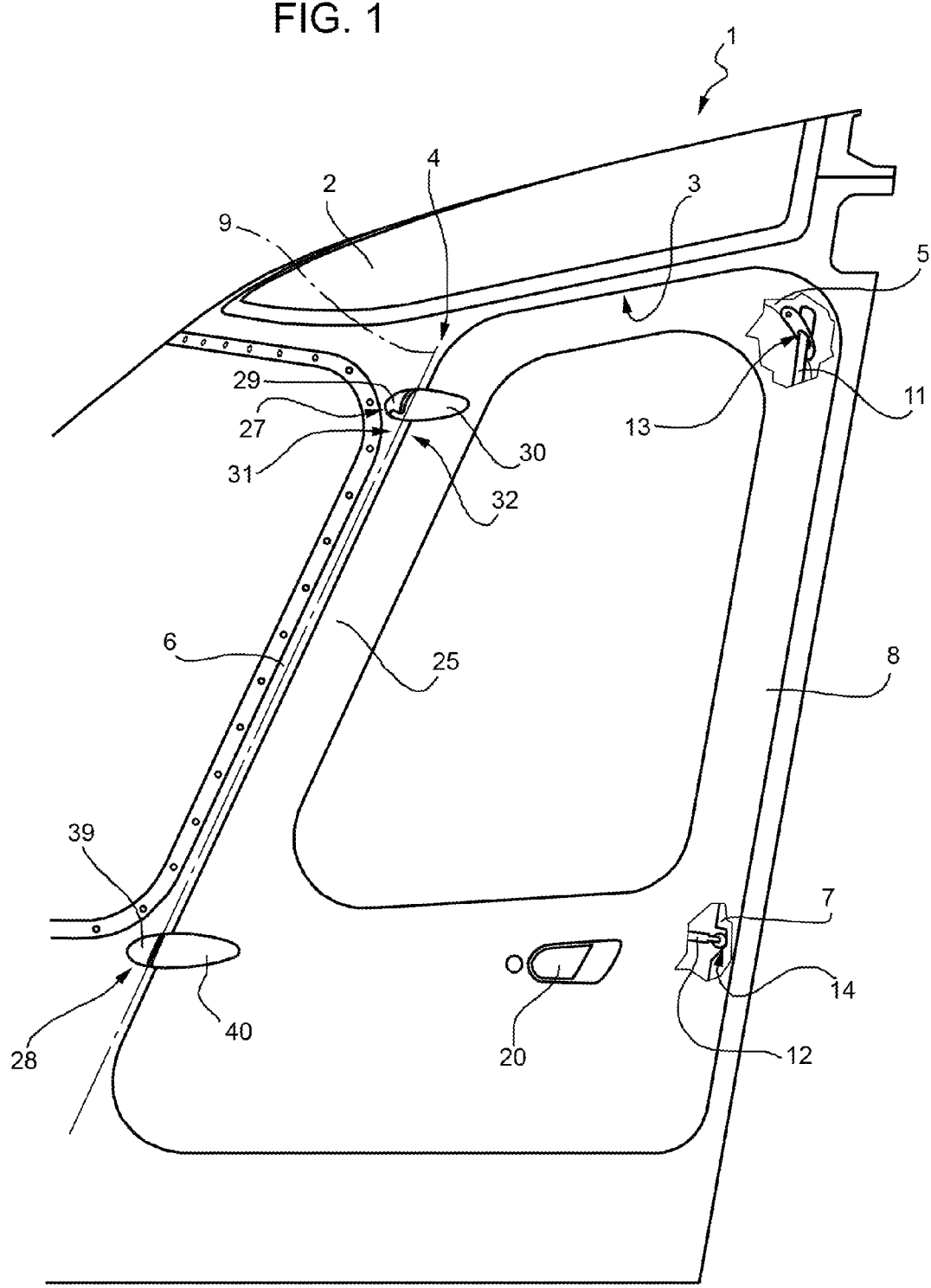
FIG. 1 shows a partial external side view of a preferred embodiment of the door assembly, in particular for a helicopter, provided with an emergency release device, according to the present invention.
Figure 2:
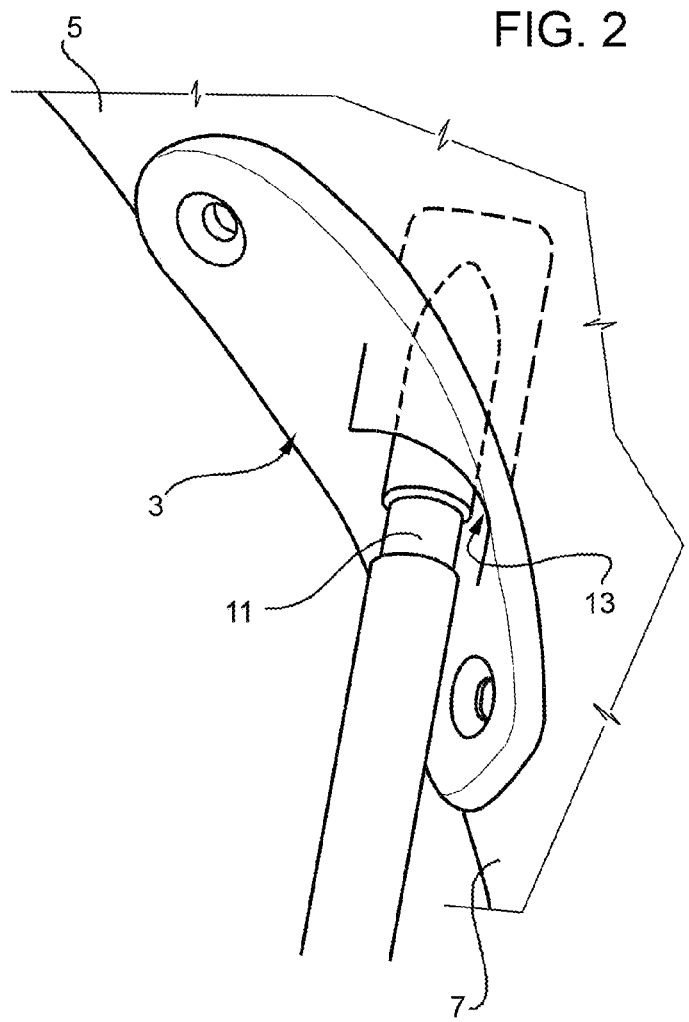
FIGS. 2 and 3 show two larger-scale details of FIG. 1.

Number 1 in FIG. 1 indicates a door assembly of a helicopter cabin 2 (shown partly). Door assembly 1 comprises a door opening 3 defined by a frame 4 forming part of the outer structure of cabin 2, and comprising a top cross member 5, a front post 6, a rear post 7, and a sill (visible in FIG. 4).

Figure 3:
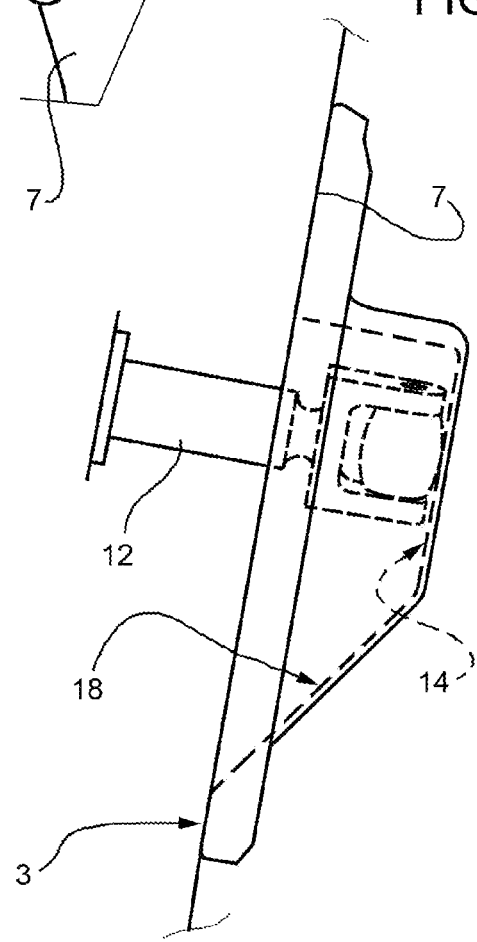

Door assembly 1 comprises a door 8 which rotates about a hinge axis 9 between an open position permitting access to the interior through door opening 3, and a closed position, in which the perimeter of door 8 engages frame 4 to seal door opening 3. Door 8 is locked in the closed position by a mechanism comprising a substantially vertical top latch 11, and a substantially horizontal bottom latch 12. When the mechanism is activated, latch 11 engages a retaining seat 13 formed between cross member 5 and post 7; and latch 12 engages a retaining seat 14 formed in post 7 and, as shown in FIG. 3, bounded at the bottom by a ramp 18, which slopes downwards from the bottom of seat 14 to door opening 3.

With reference to FIG. 1, an outer handle 20 and an inner handle (not shown) provide for opening the door normally, i.e. releasing latches 11, 12 from respective seats 13, 14 to open door 8 outwards.

Door 8 comprises a front portion 25 hinged to post 6 by two hinges 27, 28 spaced vertically apart on the outside of door assembly 1.

Hinge 27 is the top hinge and comprises two fastening bodies 29, 30 fitted in fixed positions to an outer wall 31 of post 6 and to an outer wall 32 of portion 25 respectively. More specifically, body 29 is fixed stably and adjustably to post 6 by a connecting assembly 34 described in detail below with reference to FIG. 7.

Figure 7:
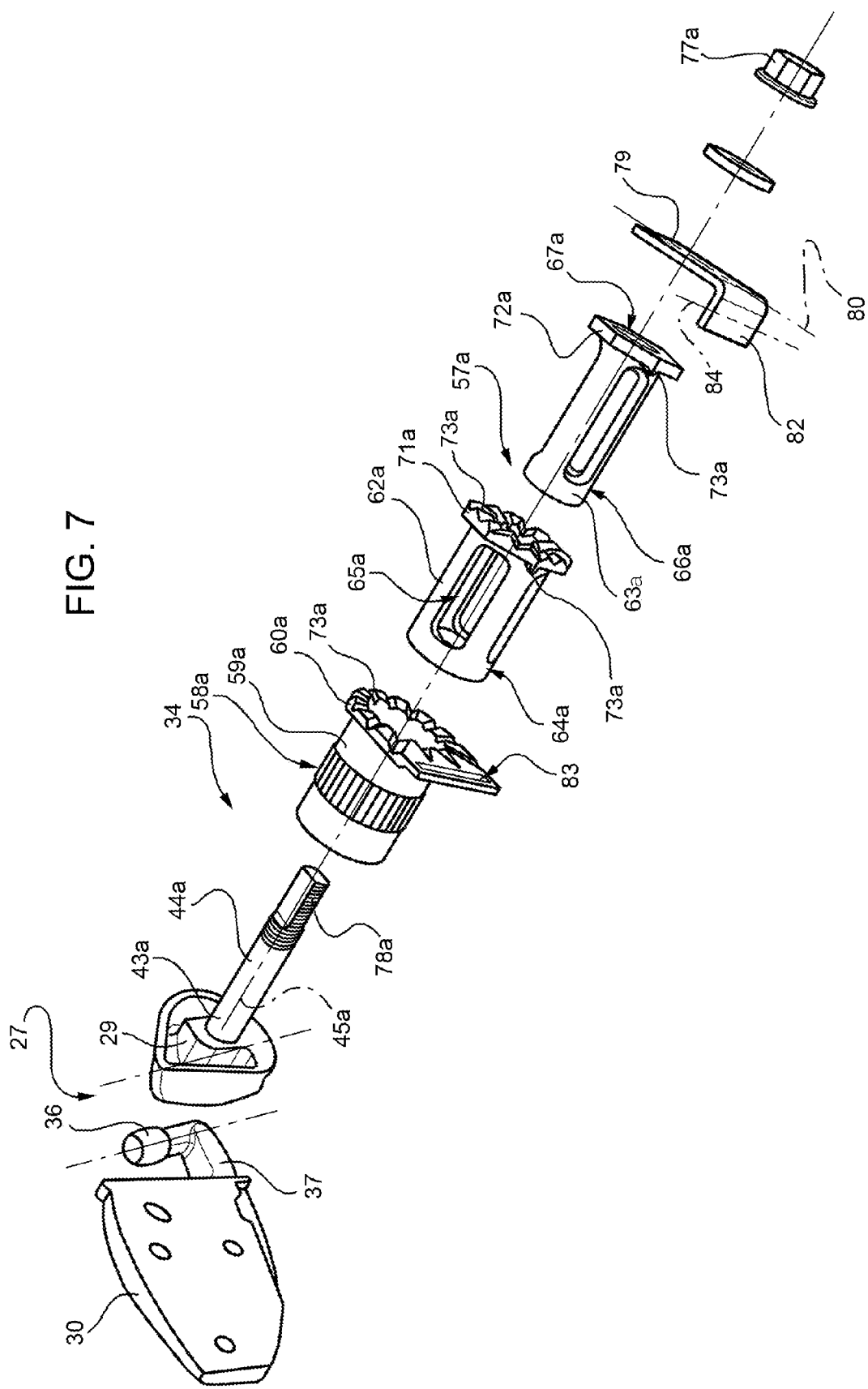
FIG. 7 shows an exploded view in perspective of other component parts of the FIG. 1 door assembly.
Figure 8:
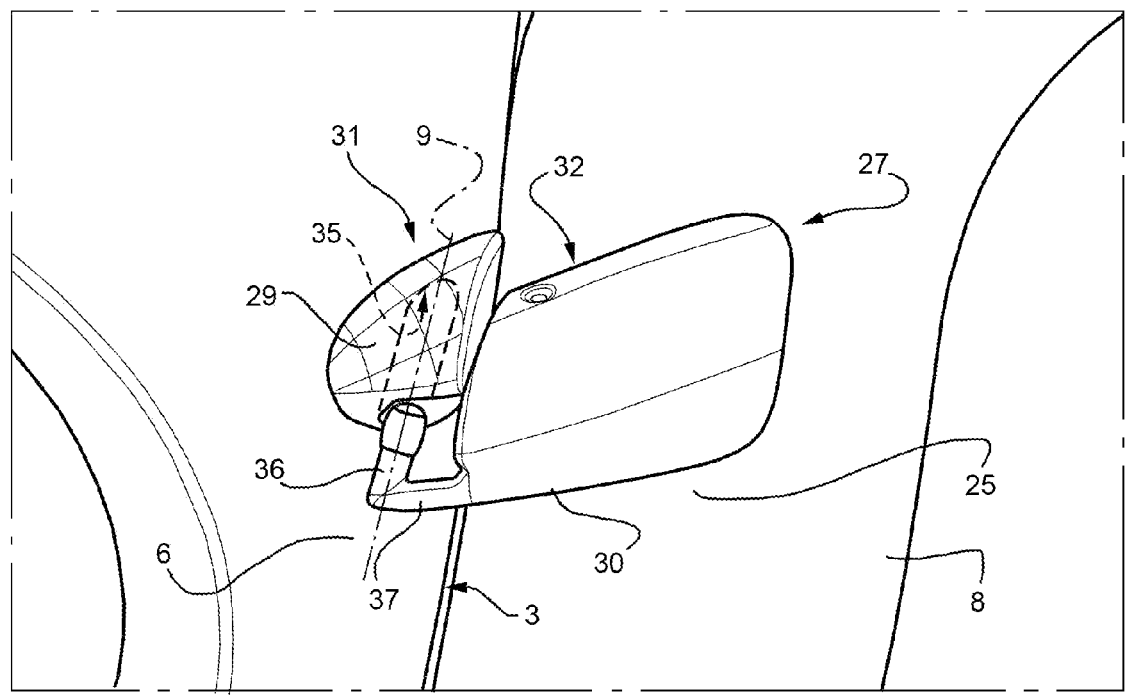
FIGS. 8 and 9 show larger-scale details of emergency release of the FIG. 1 door assembly.

As shown in FIGS. 7 and 8, body 29 defines a hinge seat 35 engaged by an axially-rotating hinge pin 36 fixed to body 30 by an arm 37. Hinge pin 36 projects upwards from arm 37 along hinge axis 9, and is free to drop out of hinge seat 35, which means more or less the entire weight of door 8 is supported by hinge 28. In an alternative embodiment (not shown), hinge pin 36 may extend axially downwards and be fixed to frame 4, over a corresponding hinge seat fixed to door 8 and free to fall away from hinge pin 36.

Figure 5:
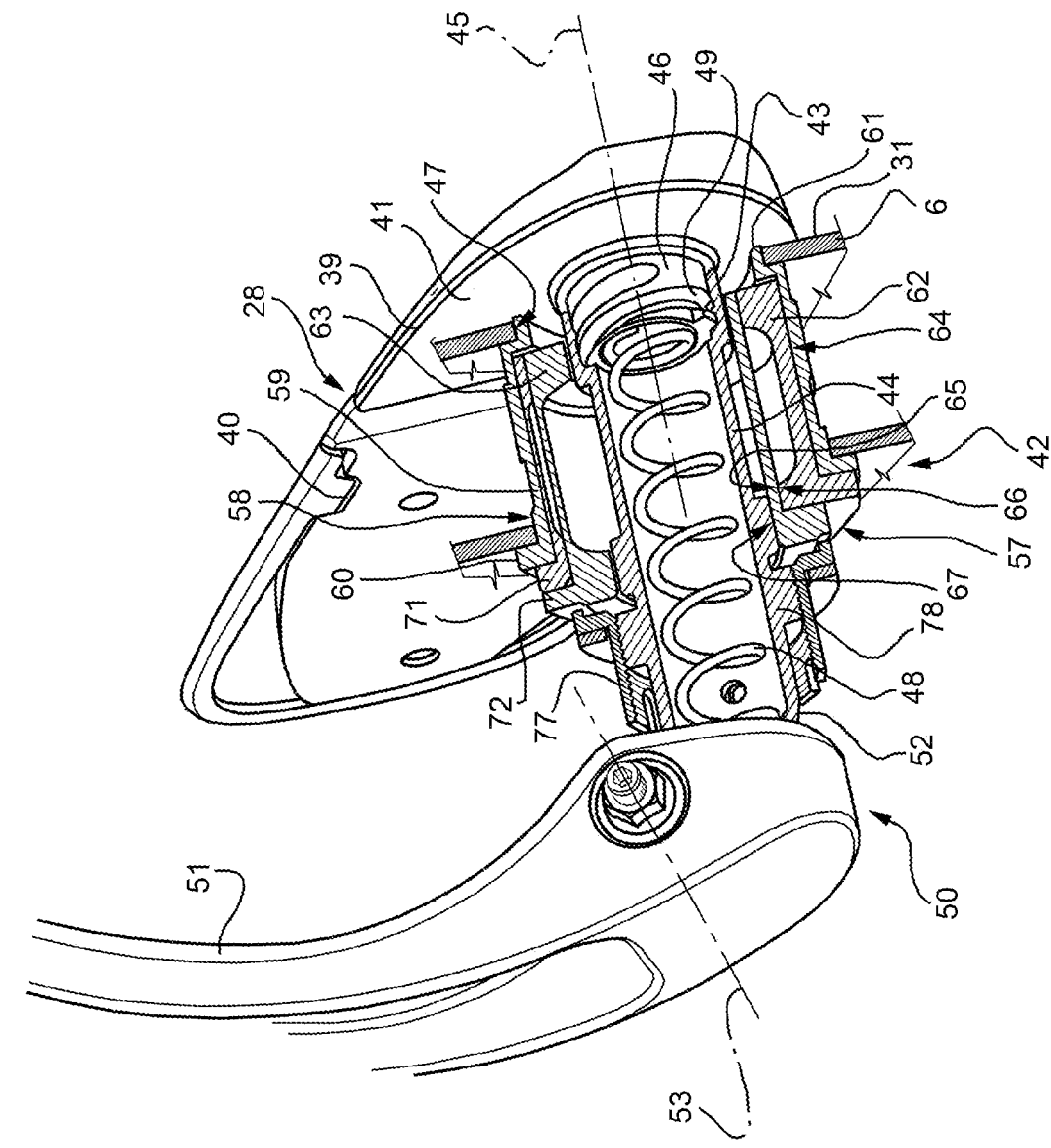
FIG. 5 shows a larger-scale, partly sectioned view in perspective of the emergency release device of the FIG. 1 door assembly.
Figure 6:
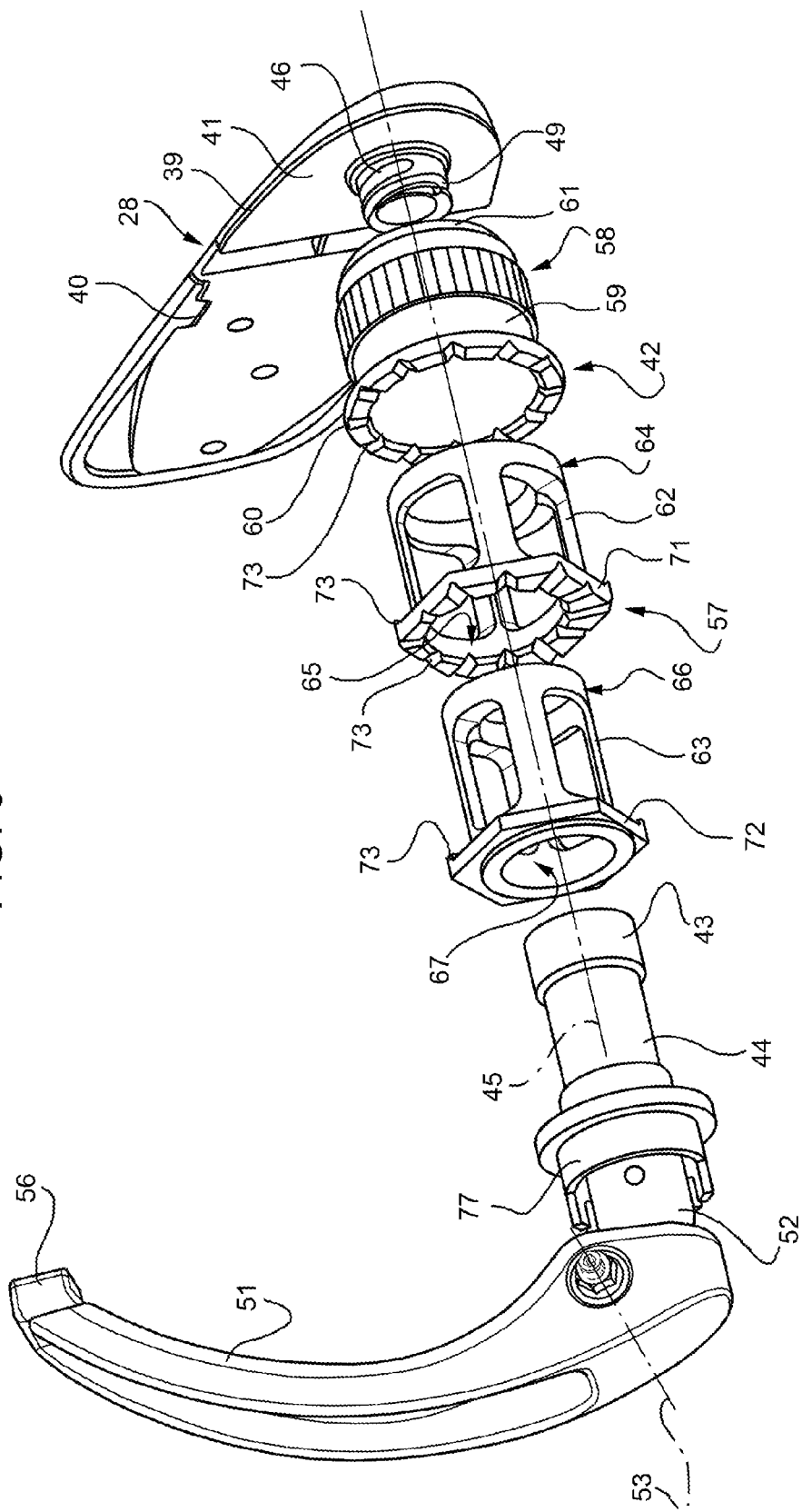
FIG. 6 shows an exploded view in perspective of FIG. 5.

As shown in FIGS. 5 and 6, hinge 28 is the bottom hinge and comprises two fastening bodies 39, 40 with a pin and seat (not shown) hinged stably to one another and coaxial with hinge pin 36 and hinge seat 35. Body 40 is fixed to wall 32, and body 39 has a base 41 resting on wall 31, possibly with the interposition of shims (not shown).

Body 39 is fixed releasably and adjustably to the post by a connecting assembly 42 comprising a stem 44, which extends through post 6 along a substantially horizontal axis 45 perpendicular to hinge axis 9, and is fixed axially along, but rotates about, axis 45 with respect to post 6. Assembly 42 also comprises a shank 46 which is coaxial with stem 44, is fixed with respect to fastening body 39, projects with respect to base 41 through a hole 47 in wall 31, and is connected releasably and in axially fixed manner to one end 43 of stem 44.

Shank 46 is released axially from end 43 when stem 44 is rotated from a first to a second angular position about axis 45. Stem 44 is conveniently axially hollow, and houses a coaxial spring 48 loaded to exert elastic axial pressure to detach shank 46 from end 43 when stem 44 reaches the second angular position. End 43 and shank 46 are preferably connected releasably by a screw-nut screw coupling 49.

Stem 44 and spring 48 form part of an emergency release device 50 comprising a release handle 51, which is connected to the opposite end 52 of stem 44 from end 43, so as to rotate together with stem 44 about axis 45. Handle 51 also rotates, with respect to stem 44 and about an axis 53 perpendicular to axis 45, between an extracted position, in which handle 51 and stem 44 are free to rotate between the first and second angular position, and a lowered position, in which the tip 56 of handle 51 engages a seat in a fork 55 (shown partly in FIG. 4) fixed with respect to post 6 and which prevents handle 51, and therefore stem 44, from rotating about axis 45.

Assembly 42 also comprises a sleeve 58 which is fixed to post 6 in a manner not shown in detail, has an axis parallel to axis 45, comprises an intermediate cylindrical portion 59 housed in post 6, and terminates axially, towards hinge 28, with an annular locating portion 61 engaging hole 47 and resting against wall 31. In the opposite axial direction, sleeve 58 terminates with a flange 60 on the outside of post 6.

Assembly 42 comprises a positioning device 57 which connects stem 44 to portion 59 to permit translation of the position of axis 45 and so adjust the position of body 39 when assembling door 8. Device 57 comprises two eccentric, rotary bushings 62, 63 nested one inside the other. That is, bushing 62 has an outer cylindrical surface 64 that mates in rotary manner with an inner cylindrical surface of portion 59; and an inner cylindrical surface 65 eccentric with respect to surface 64. And bushing 63 has an outer cylindrical surface 66 that mates in rotary manner with surface 65; and an inner cylindrical surface 67 eccentric with respect to surfaces 66, 65, and which mates in rotary manner with an outer cylindrical surface of stem 44.

Bushing 62 terminates axially with a flange 71 that rests axially against flange 60; and bushing 63 terminates axially with a flange 72 that rests axially against flange 71. Flanges 60, 71, 72 thus form axial supports between bushings 62 and 63, and between bushing 62 and sleeve 58, and have respective notches 73 which mesh to prevent rotation of bushings 62, 63, and in particular define a number of predetermined angular stop positions.

Assembly 42 also comprises a ring nut 77, which screws to a portion 78 of stem 44, between bushing 63 and end 52, and rests axially against flange 72. Ring nut 77 keeps flanges 60, 71, 72 gripped axially together, and base 41 pressed against wall 31 when stem 44 is in the first angular position. i.e. fixed to body 39. A cotter pin or dowel (not shown) prevents unscrewing of ring nut 77, which therefore rotates together with stem 44, and slides against flange 72 when handle 51 is rotated from the first to the second angular position.

With reference to FIG. 7, assembly 34 comprises the same component parts as assembly 42, which are therefore indicated using the same reference numbers as in FIG. 6, followed by the letter "a".

Unlike assembly 42, stem 44*a* of assembly 34 is solid, as opposed to hollow, and is fixed stably, as opposed to releasably, by its end 43*a* to body 29. Assembly 34 comprises a bracket 79 located axially between ring nut 77*a* and flange 72*a*, and which has a slot (not shown) engaged in angularly fixed manner by a portion 78*a* of stem 44*a*, and can slide on portion 78*a* in a radial direction 80 defined by the slot. Bracket 79 comprises an appendix 82, which engages a slot 83 in flange 60*a*, so as to slide in a direction 84. Directions 80, 84 are crosswise to each other, and lie in a plane perpendicular to axis 45*a*, so that bracket 79 locks body 29 angularly, and guides translation of axis 45*a* of stem 44*a* during adjustment.

Figure 4:
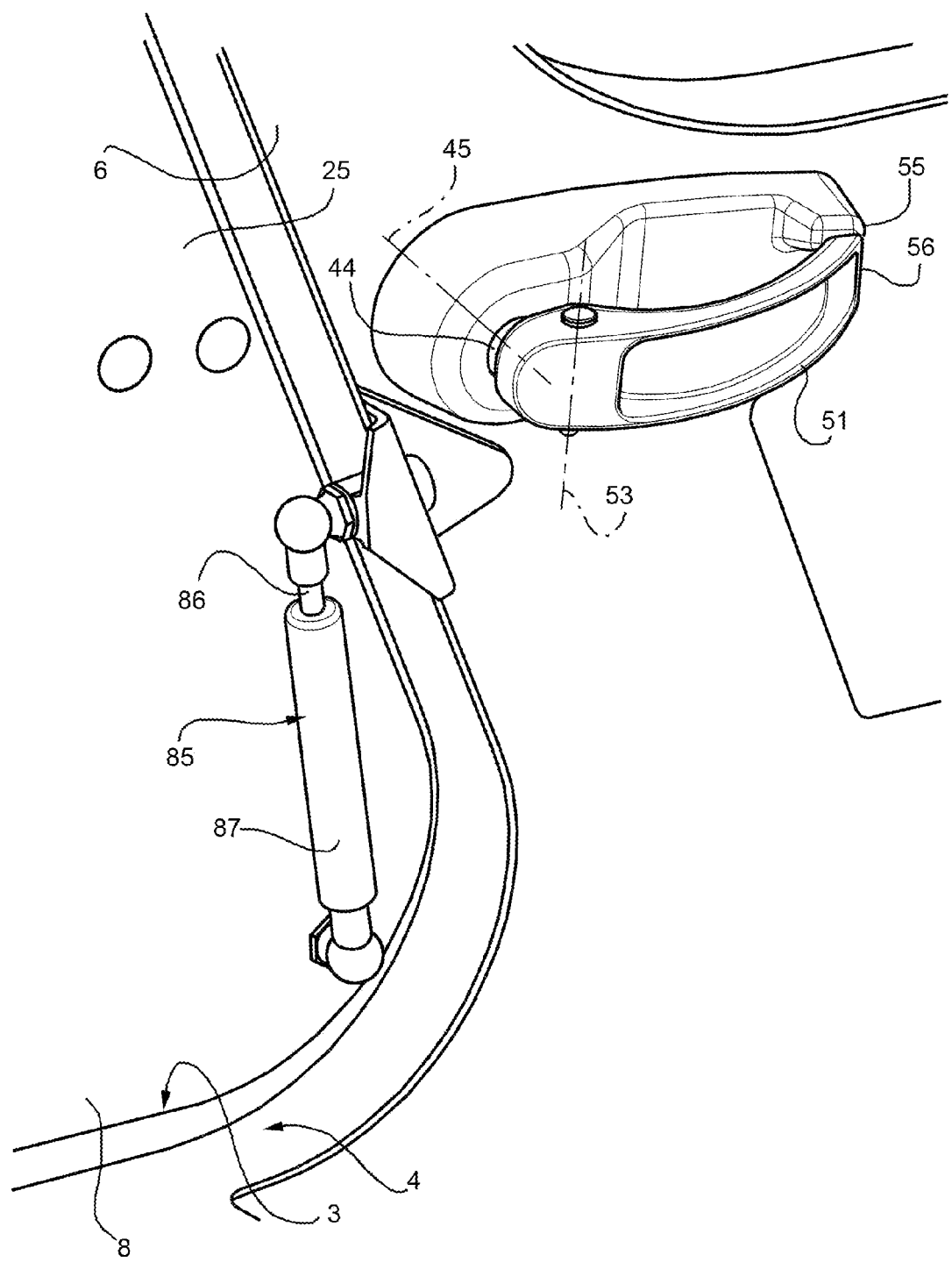
FIG. 4 shows a larger-scale view in perspective of an inner portion of the FIG. 1 door assembly.

With reference to FIG. 4, door 8 is held in the open position by a spring 85 comprising telescopic members 86, 87. More specifically, spring 85 is a gas spring connected at the ends by pivot joints to the inner wall of frame 4 and to the inner face of door 8, e.g. at a bottom portion of portion 25. When door 8 is in the closed position, spring 85 extends substantially vertically, and is compressed.

Figure 9:
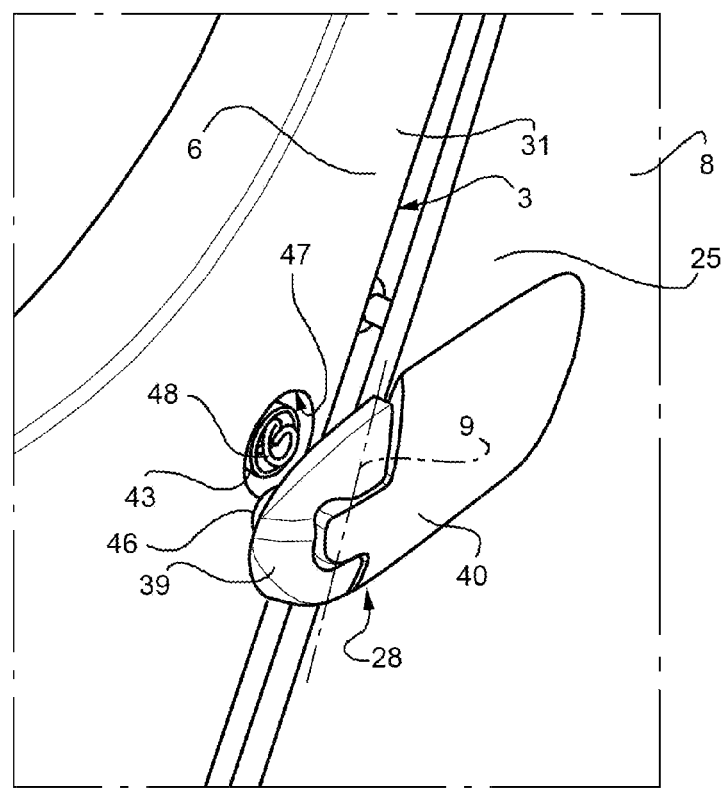

As stated, door opening 3 may be used as an emergency exit by detaching and expelling door 8 by means of device 50, despite latches 11, 12 locked inside seats 13, 14. Device 50 operates as follows: after tip 56 of handle 51 has been released from fork 55, when handle 51 is operated stem 44 rotates (anticlockwise in FIGS. 4 and 5) from the first to the second angular position and, in so doing, is not only released axially from shank 46, but also produces axial thrust to expel shank 46, by means of screw-nut screw connection 49. Once detached from end 43, shank 46 is also expelled by axial thrust produced by spring 48, which pushes shank 46 completely out of hole 47 (FIG. 9).

At this point, hinge 28 is detached from post 6, the weight of door 8, combined with the downward thrust exerted by spring 85, causes door 8 to drop, and nothing acts as a stop to prevent door 8 from falling. In fact, as door 8 drops:

members 86, 87 of spring 85 separate;
latch 11 drops freely out of seat 3;
hinge pin 36 withdraws freely from hinge seat 35 (FIG. 8); and
ramp 18 allows the end of latch 12 to slide out of seat 14 in door opening 3.

Once detached from frame 4 by device 50, door 8 therefore drops automatically to the ground to free door opening 3.

As stated, to adjust hinges 27, 28, axes 45 and 45*a* can be translated inside sleeves 58 and 58*a* when assembling door 8, to adjust the position and orientation of hinge axis 9 and so centre door 8 correctly inside door opening 3.

The procedure is the same for both assemblies 34 and 42, so is only described relative to assembly 42. After releasing and loosening ring nut 77 to slacken bushes 62, 63 axially, flanges 71 and 72 part to disengage notches 73. Bushing 62 is rotated inside sleeve 58, and bushing 63 is rotated inside bushing 62 to position stem 44, and therefore body 39, as required.

Once hinge 28 is positioned, flanges 72, 71 are pushed axially together and against flange 60 to engage notches 73 and prevent rotation of bushings 62, 63; and ring nut 77 is screwed back down to lock the set position.

Door assembly 1 therefore needs no rods or levers to detach door 8 from post 6, by virtue of handle 51 rotating together with stem 44, so door assembly 1 as a whole, and door 8 specifically, are relatively lightweight.

Moreover, by virtue of the design of hinge 27, only hinge 28 need be detached, which means only one device 50, i.e. one handle 51, is required, and emergency release can be effected quickly and one-handedly.

Using device 50, hinge 27 is detached completely from post 6 without separating the pin from the hinge seat, and therefore moving away from the post 6 is relatively quick and effective.

Assemblies 42 and 34 also provide for adjusting the position of hinges 27, 28 easily, without having to remove hinges 27, 28 completely from post 6.

Other advantages will be clear from the characteristics described above and/or claimed.

Clearly, changes may be made to door assembly 1 as described and illustrated herein without, however, departing from the scope of the present invention as defined in the accompanying Claims.

In particular, hinge 27 and assembly 34 may be substantially identical to hinge 28 and assembly 42, so two release handles may be provided, one for each hinge 27, 28.

A different releasable connection, e.g. a bayonet connection, may be substituted for screw-nut screw connection 49; and/or end 43 may be connected directly to body 39, i.e. without shank 46.

Bushings 62, 63, 62*a*, 63*a* may be eliminated or replaced by a different hinge position adjustment system.

The invention claimed is:

1. A door assembly (1), in particular for a helicopter, having a door opening (3) and comprising:
   a post (6);
   a door (8) fitted to said post by a first and second hinge (28, 27) to rotate about a hinge axis (9) to open and close said door opening (3); said first and second hinge (28, 27) being located on an outer wall (31) of said post (6); and
   an emergency release device (50) comprising a release handle (51);
   the door assembly (1) being characterized in that the emergency release device (50) further comprises a first stem (44), which extends through said post (6) along a release axis (45) substantially perpendicular to said hinge axis (9), rotates axially, in response to operation of said release handle (51), from a first to a second angular position to detach said door (8) from said post (6), is connected at one axial end (43) to said first hinge (28) and is fixed along said release axis (45);
   in that said release handle (51) is connected to said first stem (44) to rotate together with said first stem (44) about said release axis (45); and
   in that said first stem (44) is connected to said post (6) by a first positioning device (57) comprising at least one rotary eccentric component.

2. A door assembly as claimed in claim 1, wherein said first hinge (28) comprises a fastening body (39) resting in a fixed position on said outer wall (31); and wherein said first stem (44) is connected by a releasable connecting device (49) to said fastening body (39) in the first angular position, and is disconnected from said fastening body (39) in the second angular position.

3. A door assembly as claimed in claim 2, wherein said releasable connecting device comprises a screw-nut screw connection (49).

4. A door assembly as claimed in claim 2, wherein said emergency release device (50) comprises a spring (48) preloaded to produce a force which tends to move said fastening body (39) axially away from said first stem (44).

5. A door assembly as claimed in claim 1, wherein said second hinge (27) comprises:
   a hinge seat (35) fixed to one (6) of said post and said door; and
   a hinge pin (36) which is fixed to the other (8) of said post and said door, projects from a connecting arm (37) along said hinge axis (9) to engage said hinge seat (35), and faces in such a direction as to allow said door (8) to drop freely off said post (6).

6. A door assembly as claimed in claim 1, wherein said first positioning device (57) comprises two eccentric rotary bushings (62, 63) nested one inside the other.

7. A door assembly as claimed in claim 1, comprising a further connecting device (34) connecting said second hinge (27) to said post (6) and in turn comprising:
   a second stem (44*a*) fixed at one end (43*a*) to a second fastening body (29) of said second hinge (27), and extending through said post (6) along a second release axis (45*a*) substantially perpendicular to said hinge axis (9); and
   a second positioning device (57*a*) located between said second stem (44*a*) and said post (6), and comprising at least one rotary eccentric component (62*a*, 63*a*).

8. A door assembly as claimed in claim 7, wherein said second positioning device (57*a*) comprises two further rotary eccentric bushings (62*a*, 63*a*) nested one inside the other.

9. A door assembly as claimed in claim 1, wherein said release handle (51) rotates, with respect to said first stem (44) and about a lock axis perpendicular to said release axis (45), between an extracted position and a lowered position; and by comprising a retaining device (55) which only prevents rotation into said second angular position when said release handle (51) is in said lowered position.

* * * * *